Dec. 8, 1953         M. MARCUCCI         2,661,642
ATTACHMENT FOR TWIST DRILLS
Filed June 24, 1949         2 Sheets-Sheet 2
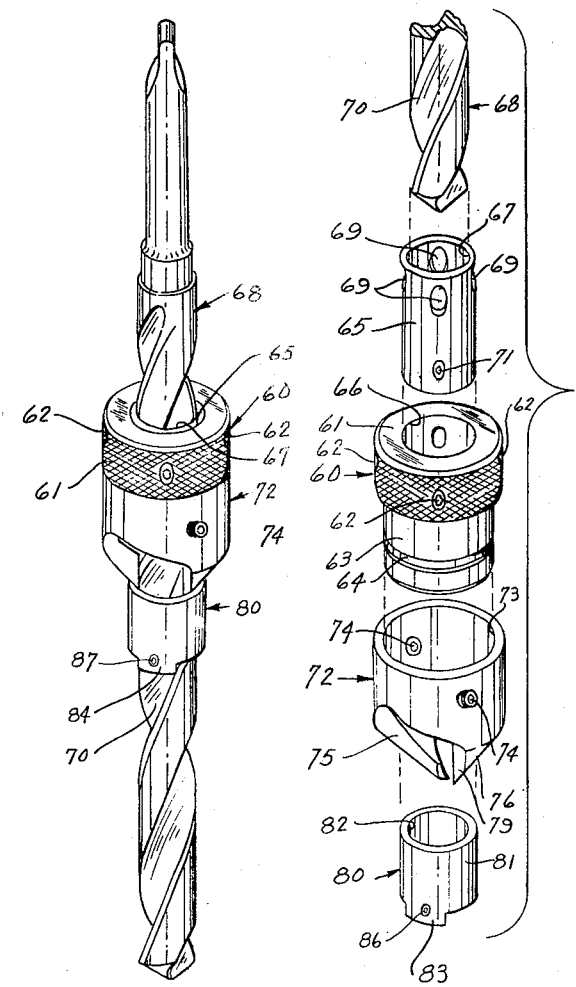
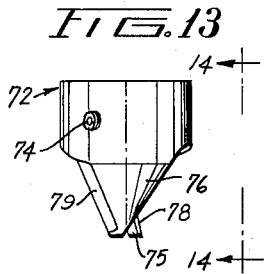
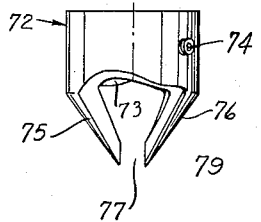
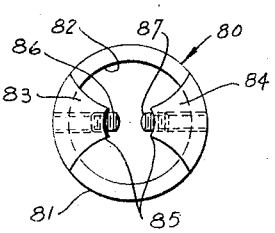
INVENTOR.
MARINO MARCUCCI
BY
ATTORNEY Patented Dec. 8, 1953

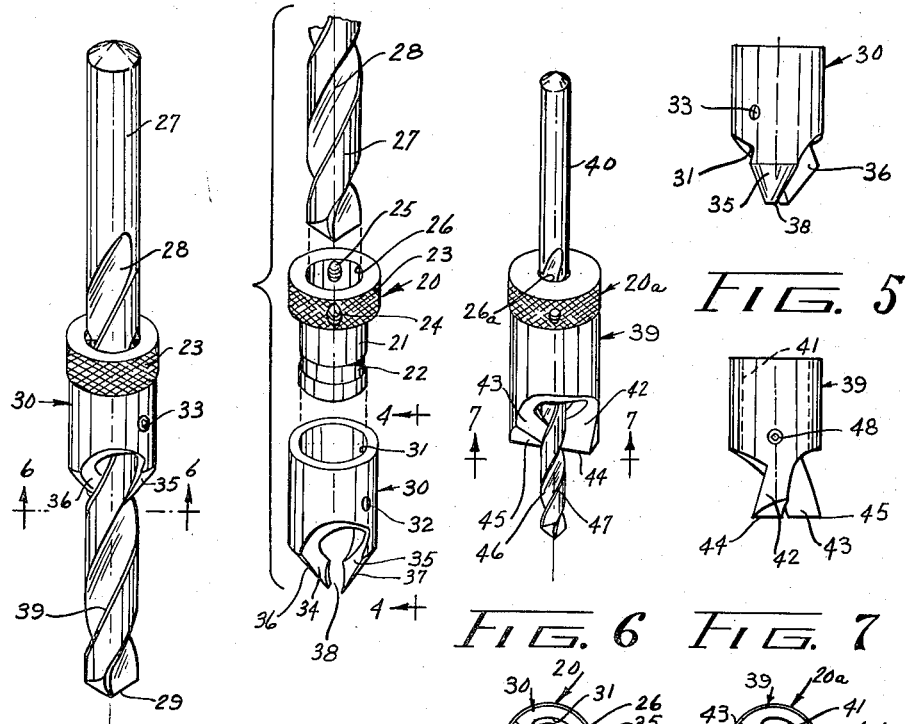

2,661,642

UNITED STATES PATENT OFFICE 2,661,642

ATTACHMENT FOR TWIST DRILLS

Marino Marcucci, Englewood, N. J.

Application June 24, 1948, Serial No. 34,885

3 Claims. (Cl. 77—66)

1

This invention relates to improvements in attachments for twist drills, and has for an object the provision of a bushing having set screws oppositely disposed therein for clamping against opposite faces of the web defined between the flutes of the drill, said bushing having a shank of reduced diameter, and a counter-sinking member and a spot facing member having internal bores which form working fits with said shank and each having a set screw, whereby either said countersink or said spot facer may be interchangeably mounted on and clamped to said shank.

Another object of the invention is the provision of a countrsink and a spot facer, each having interior bores of equal diameters and carrying a set screw, and a plurality of bushings all having shanks upon which said bores form working fits, each of said bushings having a central hole therethrough of a different diameter, for example to fit the different sizes of drills in a series and each having opposed set screws therein, whereby each bushing may be secured to its drill, and said countersink and faces may be interchangeably mounted on the bushings on any of said drills.

A further object of the invention is the provision of a countersink or a spot face attachment for twist drills adapted to be mounted on the fluted portion thereof and having the feature that the cutting edges of said attachments extend into said flutes, whereby at a single operation a hole of a predetermined size and depth may be drilled and a countersunk or a spot faced area formed at the upper end of said hole without the production of a burr between the inner surface of the hole produced by the drill and the surfaces formed by either of said attachments.

Yet another object of the invention is the provision of attachments to be mounted on a twist drill for countersinking, for spot facing, or for counterboring, said attachments being secured to the drill by set screws engaging the thin, helical central web of the drill, and the provision of a pilot attachment having internal lugs extending towards each other and carrying set screws to oppositely engage said web for securing said pilot onto said drill.

Another object of the invention is the provision of such attachments for countersinking etc., each forming a working fit on the shank of a bushing, said bushings having a head portion carrying four set screws, two opposite ones which are adapted to engage the central helical web of the drill and the other two which are adapted to engage said drill adjacent to the cutting edges thereof, and the provision of a sleeve

2 member having an outer diameter to fit the interior of said bushing and an inner diameter to fit said drill, said sleeve member having clearance holes via which said screws pass to engage said drill.

Another object of the invention is the provision of counterboring, spot facing attachments, particularly for larger sizes of drills in which the main portions of said attachments are formed of lower priced steels, and having edge holding cutting edges of carballoy mortised or otherwise set in and permanently secured thereto by brazing or welding, thereby substantially reducing the cost of such attachments.

Yet another object of the invention is the provision of a gauge for measuring the depth of a countersunk hole for any size of screw, said gauge including a slidable member movable on a fixed member, said gauge being so arranged that the screw may be positioned on one side of the gauge and the movable member slid to a position where the head of the screw is engaged by both members and thus the setting is obtained, said members carrying on the opposite side, protrusions for gauging and checking the depth of the countersink.

Other objects and advantages of the invention will be apparent to those skilled in the art upon a study of the specification and the accompanying drawings.

Referring to the drawings, which are given by way of example to illustrate the invention:

Figure 1 is an elevation showing my countersinking attachment mounted on a larger twist drill;

Figure 2 is an exploded view of the attachment shown in Figure 1;

Figure 3 is an elevation of a spot facer mounted on a drill smaller than the drill shown in Figure 1, and interchangeable with the countersink shown in Figure 1;

Figure 4 is an elevation of the countersink taken 90° with respect to the positions shown in Figures 1 and 2;

Figure 5 is an elevation of the spot facer taken 90° with respect to the position shown in Figure 3;

Figure 6 is a side view of the lower end of the countersink taken along the lines 6—6 of Figure 1;

Figure 7 is a view of the lower end of the spot facer taken along the lines 7—7 of Figure 3;

Figure 8 is an elevational view of a modified spot facer for larger sized drills and having hard inserts therein carrying cutting edges;

Figure 9 is an elevational view of the spot facer of Figure 8, taken along the lines 9—9 of Figure 8;

Figure 10 is a bottom view of the spot facer as seen along the lines 10—10 of Figure 8;

Figure 11 is an elevational view of a modification of the countersink attachment and also showing an attachable and detachable pilot mounted thereon;

Figure 12 is an exploded view of the arrangement shown in Figure 11;

Figure 13 is an elevational view of a countersink having hardened insets for cutting edges;

Figure 14 is a view of the countersink taken along the lines 14—14 of Figure 13;

Figure 15 is a view of the lower end of the pilot attachment of Figures 11 and 12.

Referring to Figures 1 and 2, a bushing 20 has a shank 21 with an annular undercut portion 22. The bushing has a head 23 with aligned holes 24, 25 formed therein. These holes are threaded to accommodate headless set screws. The bushing has a central hole 26 therethrough to accommodate a drill 27. When the bushing 20 is mounted on the drill the headless set screws in the threaded holes 24, 25 oppositely engage the helical web 28 of the drill and the bushing, by means of the set screws, may be set and locked on the drill any desired distance above the point 29 of the drill. A countersinking tool 30 has an interior bore 31 which forms a working fit on the shank 21 of the bushing, and a threaded hole 32 is provided to accommodate a headless set screw 33 which engages the undercut portion 22 of the shank 21 so that if any burr is thrown up on the surface of the countersunk portion 22, it will not extend beyond the diameter of the shank portion 21 and interfere with the placing on or removal of the countersinking tool 30 or other tools, one of which will be presently described. The countersinking tool has oppositely disposed cutters 34 and 35 formed thereon and having angular faces 36 and 37 respectively, which define the angle of the countersunk hole. For example, the angle between the faces 36 and 37 may be 82°. The space between the extremities of the cutters 34 and 35 is sufficient to clear the helical web 28 formed in the drill. Therefore they lie well below the cutting edges 39 of the drill, and consequently there is no burr formed between the countersunk hole formed by the tool 30 and the straight hole formed by the drill 27.

By providing a series of bushings in which the central holes 26 therein are adapted to fit the different drills of a series or set of drills, I can set the bushings on the various drills the proper distances from the points of the drills and thereby rapidly change from one size drill to another, and can mount the countersinking tool 30 on any one of them. In other words, by providing the series of bushings for the several sizes of drills, the countersinking tool can be rapidly shifted from one to the other with a substantial saving in time.

It will be understood, of course, that the bushing 20 is supported on the drill per se at some position intermediate the ends thereof, and that the drill is mounted in a chuck, for example, a "Jacob's" chuck in the usual manner.

In Figure 4 the countersinking tool 30 is shown in elevation in a position which has been rotated substantially 90° from the position shown in Figure 1.

Figure 6 is a view taken along the lines 6—6 of Figure 1 and showing the relation of the cutters 34 and 35 to the helical web 28 of the drill 27.

In Figure 3 the bushing 20a is identical with the bushing 20 with the exception that the central hole 26a therethrough is smaller in diameter than the hole 26, and forms a working fit on the drill 40, and although the tool mounted on the bushing in Figure 3 is not the countersinking tool 30, the shank of the bushing 20a is identical with the shank 21 of the bushing 20 and consequently the countersinking tool 30 may be mounted thereon as well as the spot facing tool 39 which is shown mounted thereon.

The spot facing tool 39 has a central hole 41 therein which forms a working fit on the shank 21 of the bushing 20 or the shank of the bushing 20a shown in Figure 3. The spot facing tool has oppositely disposed cutting members 42 and 43 carrying respectively cutting edges 44 and 45. These cutting edges extend toward each other and their extremities are spaced apart a distance slightly greater than the thickness of the helical web 46 of the drill. Consequently the cutting edges 44 and 45 extend well within the cutting edges 47 of the drill and no burr is formed between the spot face formed by the cutters 44 and 45 and the straight hole formed by the drill 40. The spot facing tool 39 may be interchangeably mounted on the bushing 20 or any other bushing of a set of bushings for a series of sizes of drills. The spot facing tool 39 carries a headless set screw 48 which engages an undercut portion of the bushing 20a like the undercut portion 22 shown on the bushing 20.

From the above it will be seen that by providing a series of bushings like the bushing 20 with different sizes of holes therethrough to individually set the drills of a series of drills, I can interchangeably mount the countersinking tool 30, the spot facing tool 39, or any other tool for special operations on the shank portion of any of said bushings interchangeably, and thereby save time and obtain better results over the methods employed in the average machine shop or fabricating plant at the present time.

Referring now to Figures 8, 9 and 10, a modified spot facing tool 49 is shown. This tool has an interior bore 50 which is adapted to form a working fit on the shank of a bushing such as the bushing 20 described above. This spot facing tool is provided with a threaded hole 51 to accommodate a set screw 52. It is also provided with oppositely disposed cutters 53 and 54 which carry cutting edges 55 and 56, respectively. Thus the tool 49 per se may be formed of the less expensive grades of steel, for example, cold rolled steel, and in forming the tool the forward edges of the cutters 53 and 54 are milled out, as at 57 and 58, and hard cutting material, for example, carballoy may be brazed, welded or otherwise secured thereto forming the cutting edges 55 and 56. The cutters 53 and 54 have their inner extremities spaced apart a distance indicated by the numeral 59, which constitutes the thickness of the helical web of the drill plus a few thousands clearance.

In constructing spot facing or countersinking tools for use in connection with the larger size of drills, a substantial saving is effected, because instead of using a large chunk of tool steel, which is expensive, mild steel or cold rolled steel may be used to form the tool, and the hard insets may be secured in the manner described above, thereby producing a superior tool at a low cost.

Referring now to Figures 11, 12, 13 and 14, a modification of the arrangement in Figures 1, 2 and 3 is shown. A bushing 60 has a knurled head 61 in which a series of tapped holes 62 is formed preferably 90° apart. The bushing has a shank 63 having a band 64 formed therein the surface of which is below its outer surface of the bushing 60. A sleeve or straight bushing 65 has its outer surface forming a working fit in a central hole 66 formed in the bushing 60 and has an interior bore 67 which forms a working fit on a drill 68.

I contemplate forming a series of bushings 65 in which the central holes 67 therein are of different diameters to fit different sizes of drills. Each of the sleeves or straight bushings 65 has a series of clearance holes 69 formed therein and these are provided to clear the set screws 62 so that two of them may oppositely engage the helical web 70 of the drill, and two of them may oppositely engage the outer surface of the drill. The bushing 65 has also oppositely disposed headless set screws 71 therein which also oppositely engage the helical web 70 of the drill. The set screws 71 are near the lower end of the bushing 65, and the clearance holes 69 are on the upper end, so that when the bushing 65 is placed on the drill the set screws 71 may be set to engage the web 70, as aforesaid, and then the bushing 60 may be applied over the bushing 65 with the set screws 62 in alignment with the clearance holes 69, so that one opposite pair of the set screws may be set to engage the web 70, and the other pair may be set to engage the outer surface of the drill.

The countersinking tool 72 has an interior bore 73 which forms a working fit on the shank 63 of the bushing 60, and when positioned thereon with its upper end against the head 61, set screws 74 in the countersinking tool 72 are in alignment with and engage the groove 64. The countersinking tool 72 has oppositely disposed cutters 75 and 76, the extremities of which extend inwardly and a space 77 which forms a clearance for the web 70 of the drill. The cutters 75 and 76 are provided with hardened inserts 78 and 79 which are of hard material and which form the cutting edges of the tool.

A bushing 80, which may form a pilot, has an outer diameter 81 which forms a working fit with a hole with which the countersinking or counterboring tool is to be centralized, and the interior bore 82 of the pilot 80 forms a fit on the drill (68 for example). The upper end of the pilot bushing 80, as may be seen in Figure 12, is open. The lower end, as may be seen in Figure 15, has projections 83 and 84 which extend toward each other, leaving a space 85 therebetween which space may be slightly greater than the thickness of the web 70. The projections 83 and 84 have aligned tapped holes therein which accommodate set screws 86 and 87, respectively, so that when the bushing 80 is positioned on the drill it may be centralized thereon by means of the set screws 86 and 87, which firmly engage the helical web 70 of the drill. Where a countersinking tool, such as the tool 72 is employed, the lower ends of the cutters 75 and 76 are positioned below the outer surfaces of the drill and are positioned well within the open end of the bore 82, and consequently no burr is formed between the angle formed by the countersink and the hole with which the surface 81 cooperates to pilot the tool. It will be apparent that other tools than the countersinking tool 72 may be mounted on the bushing 63 in order to obtain other results under the pilotage of the bushing 80, for example, spot-facing tools, counterboring tools, and other special tools for forming sockets, stepped holes, etc.

Although I have herein shown and described by way of example several modifications of the invention, it will be understood that many variations in the arrangements shown and described may be made within the scope of the following claims.

What is claimed is:

1. In an attachment for drills, a shouldered bushing adapted to be mounted on said drill, and having oppositely disposed screws therein for positively clamping it on the web between the flutes of said drill, and a tool for performing an operation mounted on said bushing with its upper end abutting the shoulder on the latter and having cutting edges which extend into the flutes of said drill.

2. In an attachment for twist drills, a bushing having a central hole therethrough forming a working fit on a drill, said bushing having a head portion and a shank portion smaller in diameter than said head portion, means on said head portion for rigidly clamping said bushing in a predetermined position on said drill by oppositely engaging the web between the flutes of said drill, a countersinking tool having an interior bore adapted to form a working fit on said shank, and means for securing said tool on said shank with its upper end abutting said head portion, said tool having cutting edges extending into the flutes of said drill, thereby discouraging the formation of burrs between a surface machined by said tool and a hole formed by said drill.

3. In a device of the character described, a drill of a predetermined size, a bushing having a head portion, a shank portion and a central hole therethrough to form a working fit on said drill, set screw means in said head portion for clamping said bushing to the drill by oppositely engaging the web between the flutes of said drill, and a tool for performing an operation, said tool having an interior bore adapted to fit the shank portion of said bushing, set screw means on said tool for securing it on said shank with its upper end abutting said head portion, groove means formed in said shank to be engaged by said last set screw means, said tool having cutting edges adapted to extend into the flutes of said drill to discourage the formation of burrs between a surface machined by said tool and a hole formed by said drill.

MARINO MARCUCCI.

References Cited in the file of this patent

UNITED STATES PATENTS

| Number | Name | Date |
|--------|------|------|
| 303,053 | Russell | Aug. 5, 1884 |
| 333,418 | Lindsey | Dec. 29, 1885 |
| 455,862 | Winsor | July 14, 1891 |
| 468,857 | Williams | Feb. 16, 1892 |
| 679,693 | Burkhart | July 30, 1901 |
| 724,963 | Spaulding | Apr. 7, 1903 |
| 1,095,185 | Broadbent et al. | May 5, 1914 |
| 1,111,410 | Semon | Sept. 22, 1914 |
| 1,516,631 | D'Erville | Nov. 25, 1924 |
| 1,987,504 | Denz | Jan. 8, 1935 |
| 2,340,941 | Dietz | Feb. 8, 1944 |
| 2,374,552 | Marini | Apr. 14, 1945 |
| 2,443,257 | Leo | June 15, 1948 |

FOREIGN PATENTS

| Number | Country | Date |
|--------|---------|------|
| 348,850 | Germany | May 15, 1922 |